US010078416B2

(12) United States Patent
Tsuda

(10) Patent No.: US 10,078,416 B2
(45) Date of Patent: Sep. 18, 2018

(54) DISPLAY CONTROL DEVICE, DISPLAY CONTROL PROGRAM AND DISPLAY-CONTROL-PROGRAM PRODUCT

(71) Applicant: DENSO CORPORATION, Kariya, Aichi-pref. (JP)

(72) Inventor: Yoshiyuki Tsuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/104,943

(22) PCT Filed: Dec. 4, 2014

(86) PCT No.: PCT/JP2014/006058
§ 371 (c)(1),
(2) Date: Jun. 15, 2016

(87) PCT Pub. No.: WO2015/092995
PCT Pub. Date: Jun. 25, 2015

(65) Prior Publication Data
US 2016/0313891 A1 Oct. 27, 2016

(30) Foreign Application Priority Data
Dec. 18, 2013 (JP) .................................. 2013-261422

(51) Int. Cl.
*G06F 3/042* (2006.01)
*G06F 3/0481* (2013.01)
(Continued)

(52) U.S. Cl.
CPC .......... *G06F 3/04812* (2013.01); *G06F 3/013* (2013.01); *G06F 3/033* (2013.01); *G06F 3/04842* (2013.01)

(58) Field of Classification Search
CPC ...... G06F 3/013; G06F 3/033; G06F 3/04812; G06F 3/04842
(Continued)

(56) References Cited

U.S. PATENT DOCUMENTS

2007/0164990 A1* 7/2007 Bjorklund ............... G06F 3/017
345/156
2010/0182232 A1* 7/2010 Zamoyski ............... G06F 3/013
345/157
(Continued)

FOREIGN PATENT DOCUMENTS

JP 2000089905 A 3/2000
JP 4168768 B2 10/2008
(Continued)

OTHER PUBLICATIONS

Simon Baker et al., "Lucas-Kanade 20 Years On: A Unifying Framework: Part 4", Technical Report CMU-RI-TR-04-14, Robotics Institute, Carnegie Mellon University, Feb. 2004.
(Continued)

*Primary Examiner* — Adam J Snyder
(74) *Attorney, Agent, or Firm* — Harness, Dickey & Pierce, P.L.C.

(57) ABSTRACT

In a display control device displaying a cursor on a display screen image based on detection results of a direction of a sight line and a manual operation of a user, a display control unit suspends a sight cursor display processing when a manual operation detection unit does not detect the manual operation of an operation device even when a sight detection unit detects the direction of the sight line with respect to the display screen image. Even when the user only moves the sight line to see a content displayed on the display screen image, the cursor is not displayed over the content. The sight cursor display processing is allowed to be executed by an action ordinary for the user such as usage of the operation
(Continued)

device when moving the cursor. Accordingly, user's convenience can be improved.

10 Claims, 3 Drawing Sheets

(51) Int. Cl.
  *G06F 3/01* (2006.01)
  *G06F 3/033* (2013.01)
  *G06F 3/0484* (2013.01)
(58) Field of Classification Search
  USPC .................................... 345/175; 178/18.09
  See application file for complete search history.

(56) References Cited

U.S. PATENT DOCUMENTS

| | | | |
|---|---|---|---|
| 2010/0328209 A1 | 12/2010 | Nakao | |
| 2011/0175932 A1* | 7/2011 | Yu | G06F 3/013 |
| | | | 345/661 |
| 2012/0272179 A1 | 10/2012 | Stafford | |
| 2012/0295708 A1 | 11/2012 | Hernandez-Abrego et al. | |
| 2013/0135196 A1* | 5/2013 | Park | G06F 3/01 |
| | | | 345/156 |
| 2013/0169560 A1* | 7/2013 | Cederlund | G06F 3/013 |
| | | | 345/173 |
| 2013/0176250 A1* | 7/2013 | Lee | G06F 3/013 |
| | | | 345/173 |
| 2013/0265227 A1* | 10/2013 | Julian | G06F 3/04812 |
| | | | 345/157 |
| 2013/0293488 A1* | 11/2013 | Na | G06F 3/013 |
| | | | 345/173 |
| 2014/0268054 A1* | 9/2014 | Olsson | G06F 3/013 |
| | | | 351/209 |
| 2014/0333535 A1 | 11/2014 | Stafford | |
| 2015/0199005 A1* | 7/2015 | Haddon | G06F 3/013 |
| | | | 345/163 |

FOREIGN PATENT DOCUMENTS

| | | |
|---|---|---|
| JP | 2009183473 A | 8/2009 |
| JP | 2009193423 A | 8/2009 |
| JP | 2013210742 A | 10/2013 |
| WO | WO-2012145180 A1 | 10/2012 |

OTHER PUBLICATIONS

Takahiro Ishikawa et al., "Passive Driver Gaze Tracking With Active Appearance Models", Technical Report CMU-RI-TR-04-08, Robotics Institute, Carnegie Mellon University, Jan. 2004.

* cited by examiner

DISPLAY CONTROL DEVICE, DISPLAY CONTROL PROGRAM AND DISPLAY-CONTROL-PROGRAM PRODUCT

CROSS REFERENCE TO RELATED APPLICATIONS

This application is a U.S. National Phase Application under 35 U.S.C. 371 of International Application No. PCT/JP2014/006058 filed on Dec. 4, 2014 and published in Japanese as WO 2015/092995 A1 on Jun. 25, 2015. This application is based on and claims the benefit of priority from Japanese Patent Application No. 2013-261422 filed on Dec. 18, 2013. The entire disclosures of all of the above applications are incorporated herein by reference.

TECHNICAL FIELD

The present disclosure relates to a display control device, a display control program and a display control program product that control displaying of a display.

BACKGROUND ART

It has been conventionally known a coordinate calculation method to calculate sight line detection coordinates that indicate a position of user's sight line on a display screen image based on an output signal outputted from a sight line detection device that detects a direction of user's sight line, to calculate a value of manual input correction based on information of user's manual input operation received from an operation device such as a mouse, and to obtain input coordinates by adding the value of manual input correction to the sight line detection coordinates (for example, see patent literature 1).

PRIOR ART LITERATURE

Patent Literature

Patent Literature 1: JP 2000-89905 A

SUMMARY OF INVENTION

However, in the case where the conventional coordinate calculation method is applied to a display control device that displays a cursor such as a pointer on the display screen image, even when, for example, the user only moves the sight line to see a content on the display screen image, the cursor is displayed at the input coordinates that are calculated based on a direction of the sight line. As a result, there is a possibility that the user has difficulty in seeing the content.

It is an object of the present disclosure to provide a technique capable of increasing convenience of a user in a display control device that displays a cursor on a display screen image based on detection results of a direction of a sight line of the user and a manual operation of the user.

According to an aspect of the present disclosure, a display control device displaying a cursor on a display screen image includes a sight detection unit, a manual operation detection unit and a display control unit. The sight detection unit detects a direction of a sight line of a user with respect to the display screen image. The manual operation detection unit detects a manual operation of the user. The display control unit executes a sight cursor display processing to display the cursor on the display screen image based on a detection result of the sight detection unit, and executes a manual cursor display processing to display the cursor on the display screen image based on a detection result of the manual operation detection unit.

The display control unit of the display control device of the present disclosure has a sight suspension unit that suspends the sight cursor display processing when the manual operation detection unit does not detect the manual operation of the user even when the sight detection unit detects the direction of the sight line of the user.

In the display control device, even when the user moves the sight line with respect to the display screen image, the cursor does not move to a position on the display screen image corresponding to the direction of the sight line of the user under a condition that the operation device such as a mouse is not operated.

For example, when the user only moves the sight line to see the content displayed on the display screen image, the cursor is not displayed over the content. As a result, a visibility of the content is not decreased.

The sight cursor display processing is allowed to be executed by an action ordinary for the user such as a usage of the operation device when moving the cursor. Therefore, the user can move the cursor on the display screen image without any special operations.

According to the aspect of the present disclosure, convenience of the user can be improved in the display control device that displays the cursor on the display screen image based on the detection results of the direction of the sight line of the user and the manual operation of the user.

The display control device described above can be distributed in market as a program. Specifically, the program allowing a computer to function as the above described sight detection unit, the manual operation detection unit and the display control unit can be distributed.

The program can achieve the similar effects as the effects achieved by the display control device by being integrated to one or more computers. The program may be stored in a ROM or a flash memory integrated to the computer. The program may be executed by being loaded into the computer from the ROM or the flash memory, or by being loaded into the computer via the internet.

The program may be employed by being stored in any types of computer-readable storage medium. The storage medium includes a portable semiconductor memory (for example, USB memory). The storage medium may be a non-transitory tangible computer-readable medium. The program may be employed as a program product stored in the storage medium.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Hereinafter, a display control device 1 will be described as embodiments of the present disclosure with reference to the drawings.

The present disclosure will not be limited in the embodiments described hereinafter. The embodiments described hereinafter may be partially omitted as far as a matter of the present embodiment can be solved.

(Entire Structure)

A display control device 1 includes one or plural well-known computer having a CPU, a ROM, a RAM and the like. A CPU executes various processings based on a program stored in the ROM or an external memory (for example, a memory device 5) using the RAM as a working area.

Figure 1:
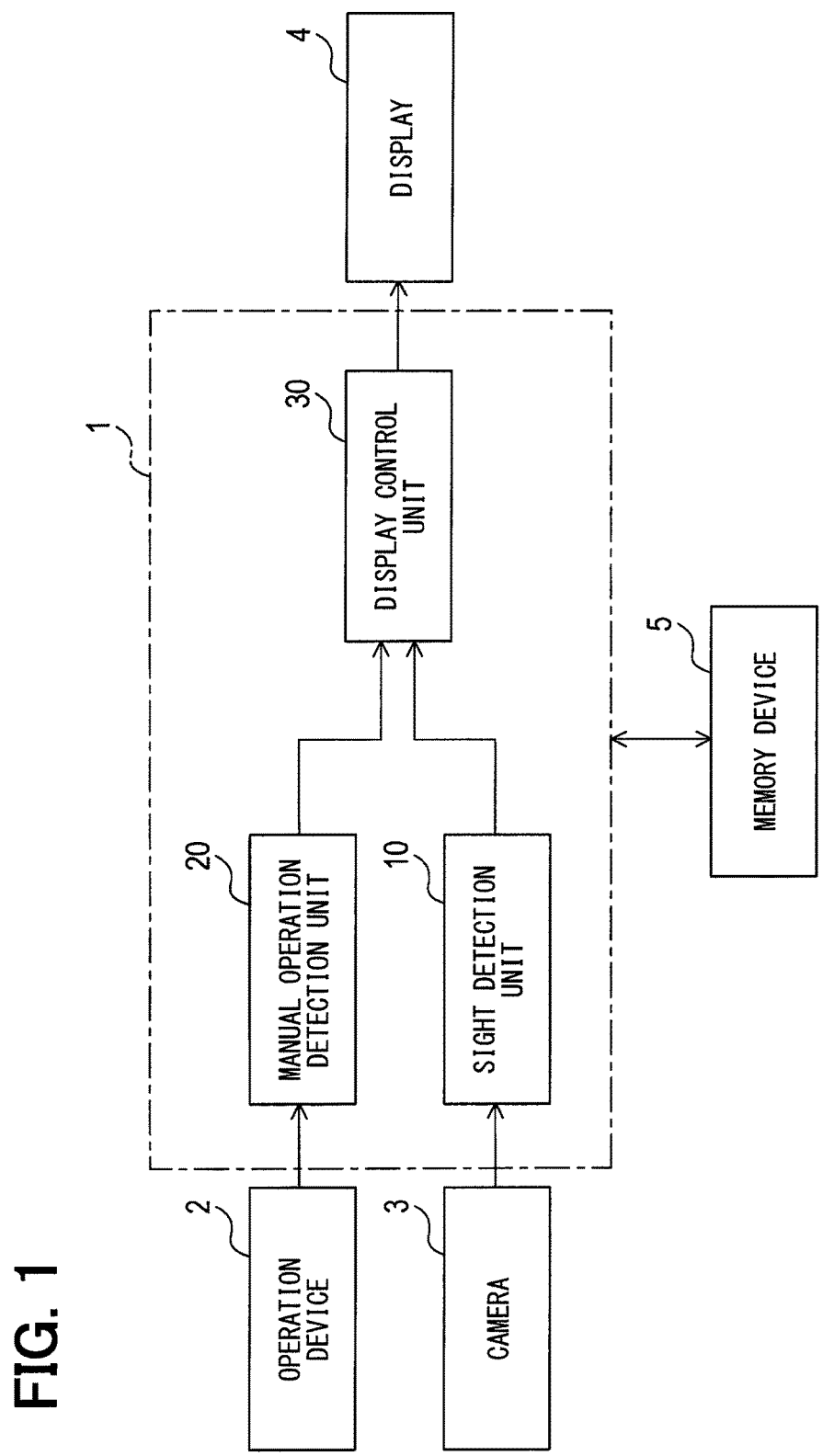
FIG. 1 is a block diagram illustrating structures of a display control device and peripheral devices.

As shown in FIG. 1, the display control device 1 includes a sight detection unit 10, a manual operation detection unit 20 and a display control unit 30, which are functional structures. The display control device 1 is connected to an operation device 2, a camera 3, a display 4 and the memory device 5, which are peripheral devices.

The camera 3 has an image sensor element such as a CCD or a CMOS. The camera 3 is located at a position (for example, around the display 4) to photograph a user of the display control device 1 and the peripheral devices from a front, so that the camera 3 can photograph a user's face from a front.

The sight detection unit 10 detects a direction of user's face and a direction of user's sight line with respect to a screen of the display 4 by analyzing an image of the user photographed by the camera 3 and outputted from a camera interface (not illustrated). For a method of detecting a direction of a face, for example, a method disclosed in "Lucas-Kanade 20 years on: A unifying framework: Part 4", S. Baker et al., Technical Report CMU-RI-TR-04-14, Robotics Institute, Carnegie Mellon University, February, 2004. can be employed. For a method of detecting a direction of a sight line, for example, a method disclosed in "Passive Driver Gaze Tracking With Active Appearance Model", T. Ishikawa et al., Technical Report CMU-IR-TR-04-08, Robotics Institute, Carnegie Mellon University, January, 2004. can be employed.

The display 4 includes a liquid crystal display or an organic electroluminescence display or the like. The display 4 displays various contents and cursors based on an output data outputted from the display control device 1 (or the display control unit 30).

A screen image of the display 4 on which various contents are displayed includes, for example, a screen image on which a webpage is displayed when an internet browser is executed (hereinafter, referred to as "a webpage screen image"), a screen image on which a desktop image is displayed when an operation system (OS) is executed (hereinafter, referred to as "a desktop screen image"), and a screen image on which an image preliminary prepared by the application is displayed (hereinafter, referred to as "an application screen image"). Hereinafter, the webpage screen image, the desktop screen image and the application screen image are commonly referred to as a display screen image.

The cursor includes, for example, a mouse pointer, a bar or a caret displayed between letters, a cursor surrounding a selection object, or a cursor highlighting the selection object. The selection object includes, for example, a link on the webpage screen image, a file or a folder on the desktop screen image, an image designating a command or the like on the application screen image.

The memory device 5 includes a hard disk drive or the like. The memory device 5 stores a software program including the OS, the browser or the application, and a conversion table of the sight coordinates indicating a relation between the direction of the sight line detected by the sight detection unit 10 and the sight detection coordinates of user's sight position on the display screen image.

The memory device 5 has storage areas for storing various information such as information relating to a base position (described later) set by the display control unit 30, or information relating to a user setting for ON/OFF of sight-input or a mode setting providing a position where the cursor is displayed according to the sight-input.

The operation device 2 includes a mouse, a track pad or the like.

The manual operation detection unit 20 is electrically connected to the operation device 2. The manual operation detection unit 20 detects a direction and the amount of the operation of the operation device 2 manually operated by the user.

The display control unit 30 displays various display screen images based on the software program stored in the memory device 5. The display control unit 30 changes a position where the cursor is being displayed on the display screen image based on an input from the sight detection unit 10 and the manual operation detection unit 20 (additionally, the camera 3 and the operation device 2). The display control unit 30 executes a processing for forming the conversion table of the sight coordinates by executing a known calibration for detecting a direction of sight line (for example, see JP 2009-183473 A).

(Cursor Display Control Processing)

Figure 2:
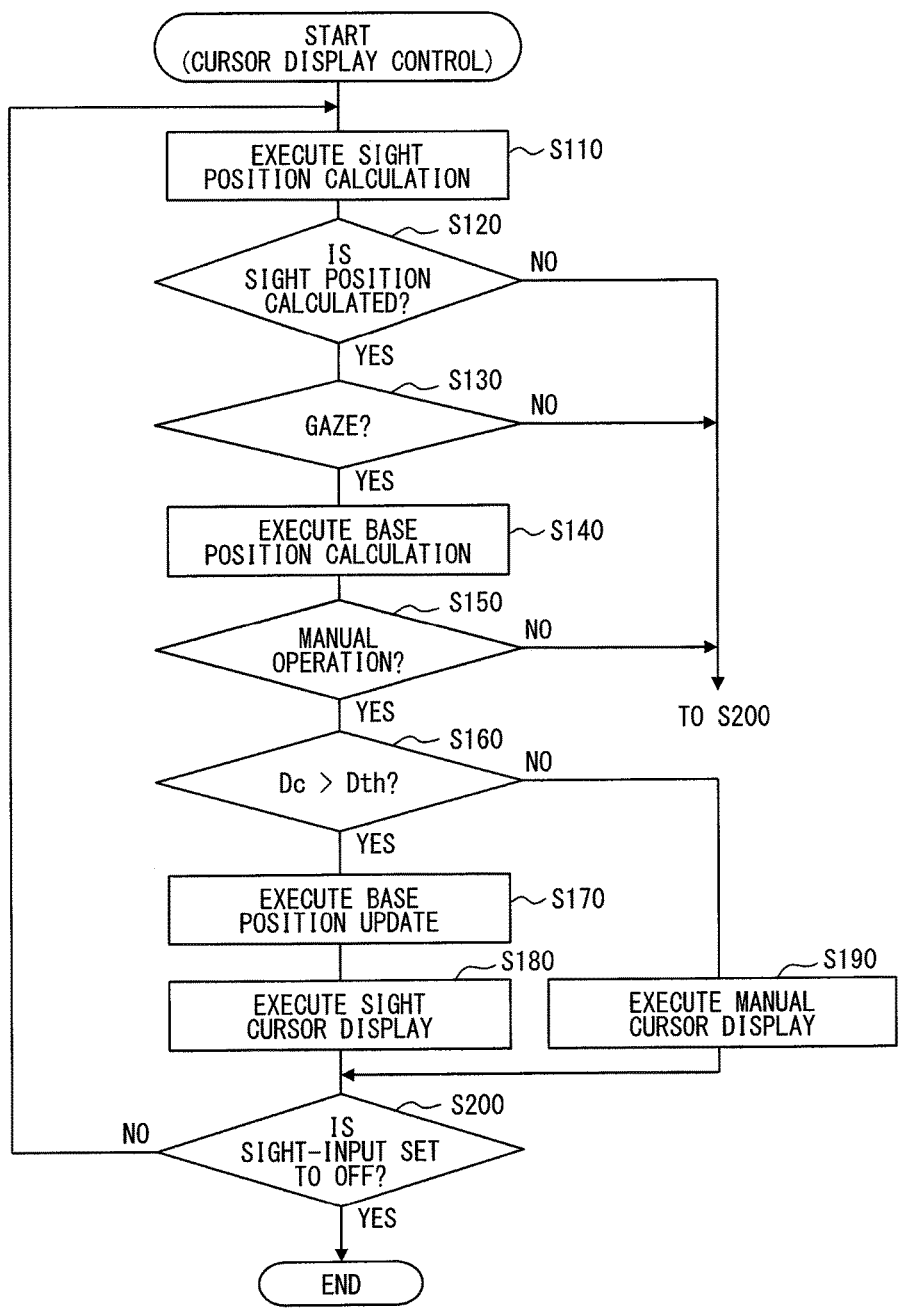
FIG. 2 is a flowchart illustrating details of a processing executed by a display control unit.

A cursor display control processing, which is executed by the display control unit 30, to change a position where the cursor is displayed on the display screen image will be described with reference to FIG. 2. The cursor display control processing is started when the user sets a sight-input to be active. The cursor display control processing is also started when a power source is turned on in a state where the sight-input is set to be active.

After the cursor display control processing is started, the display control unit 30 starts a sight position calculation processing at S110. In the sight position calculation processing, the display control unit 30 calculates a position (i.e., a sight position) on the display screen corresponding to a direction of user's sight line based on information (hereinafter, referred to as sight detection information) relating to a detection result of the user's sight line transmitted from the sight detection unit 10. Specifically, the sight position of the user is obtained by reading sight detection coordinates corresponding to the direction of user's sight line detected by the sight detection unit 10 from the conversion table of the sight coordinates stored in the memory device 5. The display control unit 30 sequentially receives the sight detection information. The sight positions calculated by the display control unit 30 are stored in the RAM in a chronological order.

At S120, the display control unit 30 determines whether the display control unit 30 can calculate the sight position of the user at S110. When the display control unit 30 determines that the sight position is calculated, that is, when the sight detection unit 10 detects the direction of the sight line, the processing proceeds to S130. When the display control unit 30 determines that the sight position is not calculated, that is, when the sight detection unit 10 does not detect the direction of the sight line, the processing proceeds to S200.

At S130, the display control unit 30 determines whether the sight position of the user, which is determined to be calculated by the display control unit 30 at S120, is equal to a gaze position of the user, the gaze position being a position at which the user faces the same direction for a prescribed time. When the display control unit 30 determines that the sight position of the user is equal to the gaze position, the processing proceeds to S140. When the display control unit 30 determines that the sight position of the user is not equal to the gaze position, the processing proceeds to S200. Specifically, the sight position is set as the gaze position when the display control unit 30 determines that a movement of the sight position exceeding a prescribed range is not repeated for a prescribed number.

At S140, the display control unit 30 executes a base position calculation processing, in which the display control unit 30 calculates a position (i.e., a base position) at which the cursor is firstly displayed on the display screen image, based on the gaze position set at S130. Specifically, in the base position calculation processing, the display control unit 30 calculates the base position by different methods depending on the information relating to the mode setting stored in the memory device 5.

Figure 3:
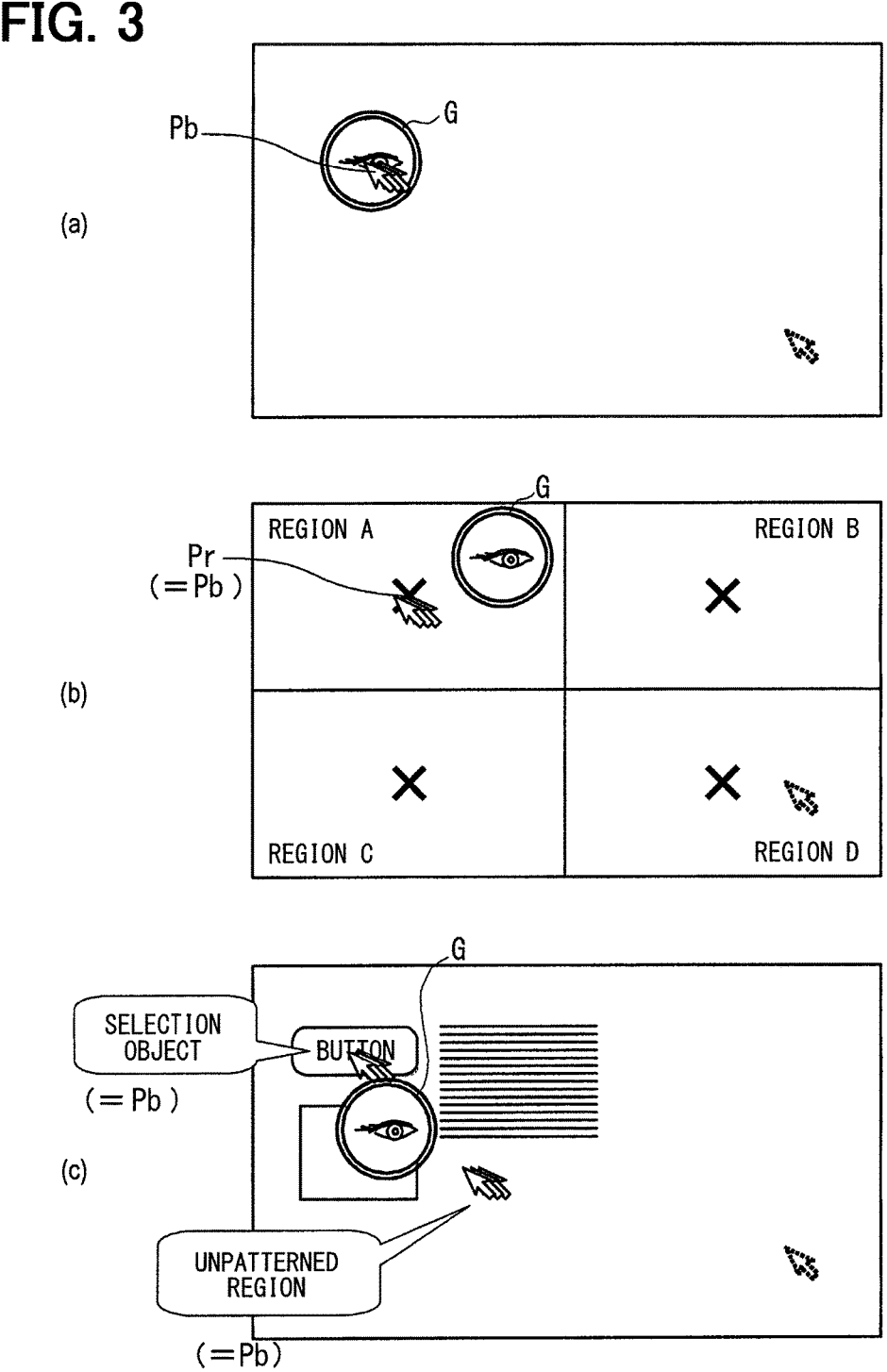
FIG. 3 is a diagram illustrating aspects of a relation of a position where a cursor is displayed on a display screen image by a sight cursor display processing and a sight position (gaze position) of a user on the display screen image.

For example, in the base position calculation processing, based on the mode set by the user, the gaze position G set at S130 is calculated as the base position Pb (see, (a) of FIG. 3), or a represent position Pr preliminarily set within a region that is one of regions A to D and includes the gaze position G set at S130 is calculated as the base position Pb (see, (b) of FIG. 3). The display screen image is divided into the regions A to D (in the present embodiment, an area of the display screen image is equally divided into the regions A to D). The represent position Pr may be preliminarily fixed such as a center position of the region, or the represent position Pr may be changed depending on the contents displayed on the display screen image.

Also, a position of the selection object closest to the gaze position G set at S130 is calculated as the base position Pb, or a position in an unpatterned region of the display screen image close to the gaze position set at S130 is calculated as the base position Pb (see, (c) of FIG. 3). The position of the selection object and the position in the unpatterned region may be calculated as the represent position Pr described above. The unpetterned region of the display screen image is a monochromatic region such as a blank and a region that does not include any letters, drawings, pictures or the like.

At S150, the display control unit 30 determines whether information (hereinafter, referred to as manual operation detection information) relating to the detection result of the operation device 2 is transmitted from the manual operation detection unit 20. When the display control unit 30 determines that the manual operation detection information is transmitted, that is, when the manual operation using the operation device 2 is performed by the user, the processing proceeds to S160. When the display control unit 30 determines that the manual operation detection information is not transmitted, that is, when the manual operation using the operation device 2 is not performed by the user, the processing proceeds to S200.

At S160, the display control unit 30 determines whether a distance Dc (hereinafter, referred to as a cursor movement distance) between a present position of the cursor having been displayed on the display screen image and the gaze position set at S130 exceeds a threshold distance Dth that is preliminarily set. When the display control unit 30 determines that the cursor movement distance exceeds the threshold distance Dth, the processing proceeds to S170. When the display control unit 30 determines that the cursor movement distance is equal to or less than the threshold distance Dth, the processing proceeds to S190.

At S170, the display control unit 30 updates the information stored in the memory device 5 and relating to the base position Pb based on the gaze position set at S130.

At S180, the display control unit 30 executes a sight cursor display processing to display the cursor at the sight detection coordinates on the display 4 updated at S170. In the sight cursor display processing of the present embodiment, the cursor that has been displayed on the display screen image is deleted and the cursor is immediately displayed at the sight detection coordinates updated at S170.

On the other hand, at S190, the display control unit 30 executes a manual cursor movement processing to move and display the cursor at a potion on the display screen image corresponding to a direction or an amount of the operation of the operation device 2 manually operated by the user, based on the manual operation detection information transmitted at S150. In the manual cursor movement processing of the present embodiment, differently from the sight cursor display processing, the cursor is displayed so that the cursor having been displayed on the display screen image is moved to the position corresponding to the user's manual operation.

At S200, the display control unit 30 determines whether the sight-input is set to be off by the user based on the information stored in the memory device 5 and relating to the user' mode setting. When the sight-input is determined to be set to be off, the cursor display control processing is finished. When the sight-input is determined to be set to be active, the processing returns to S110.

(Effects)

As described above, in the cursor display control processing in the display control device 1, the sight cursor display processing is suspended when the manual operation detection unit 20 does not detect the manual operation of the operation device 2 (S150; NO) even when the sight detection unit 10 detects the direction of the sight line of the user with respect to the display screen image (S120; YES).

Even when the user moves the sight line with respect to the display screen image, the cursor does not move to the position on the display screen image corresponding to the direction of the sight line of the user when the operation using the operation device 2 such as a mouse is not performed.

For example, when the user only moves the sight line to see the content displayed on the display screen image, the cursor is not displayed over the content. As a result, a visibility of the content is not decreased.

The sight cursor display processing is allowed to be executed by an action ordinary for the user such as a usage of the operation device 2 when moving the cursor. Therefore, the user can move the cursor on the display screen image without any special operations.

According to the display control device 1, user's convenience can be increased in the display control device 1 that displays the cursor on the display screen based on the detection results of the direction of the sight line of the user and the manual operation of the user.

In the cursor display control processing in the display control device 1, the manual cursor display processing is suspended when the sight detection unit 10 does not detect the direction of the sight line of the user with respect to the display screen image (S120; NO) even when the manual operation detection unit 20 detects the manual operation of the operation device 2 (S150; YES).

Even when the manual operation using the operation device 2 is performed, the cursor does not move to the position on the display screen image corresponding to the manual operation under the condition that the user does not look at the display screen image.

For example, when the manual operation caused by an operation error of the operation device is detected, the cursor is restricted from moving toward an unexpected direction. Further, the manual cursor display processing is allowed to be executed by an action ordinary for the user such as looking at the display screen image when moving the cursor. Therefore, the user can move the cursor on the display screen image without any special operations. According to the display control device 1, user's convenience can be improved.

In the cursor display control processing of the display control device 1, the cursor movement distance Dc is defined as the distance between the sight position calculated in the sight position calculation processing (S110) and the present position on the display screen image at which the cursor is presently displayed. In the cursor display control processing of the display control device 1, the display control unit 30 executes the sight cursor display processing (S180) when the cursor movement distance is greater than the predetermined threshold distance (S160; YES), and the display control unit 30 executes the manual cursor display processing (S190) when the cursor movement distance is equal to or smaller than the predetermined threshold distance (S160; NO).

For example, when the user intends to largely move the position at which the cursor is displayed on the display screen image, the user can move the position of the cursor by looking at the position to which the user intends to move the cursor. When the user intends to finely adjust the position of the cursor, the user can adjusts the position of the cursor by operating the operation device 2. As a result, both a reduction of burden of the user and an accurate cursor movement can be achieved, and thus, convenience of the user can be further improved.

For example, in the case that the position of the cursor is difficult to be found on the display screen image, the cursor is displayed at the position corresponding to the direction of the sight line of the user when the user largely moves the sight line to the position at which the cursor is desired to be displayed. As such, the user does not have to search the cursor by operating the operation device 2. Furthermore, even when the user slightly moves the sight line to see the content displayed on the display screen image, the cursor is not moved to follow the direction of the sight line. Therefore, a visibility of the content is not decreased.

In the cursor display control processing of the display control device 1, the display control unit 30 executes the base position calculation processing (S140) to select the base position corresponding to the sight position (or, in details, the gaze position set at S130), which is calculated in the sight position calculation processing (S110), based on the information relating to the mode setting stored in the memory device 5. In the sight cursor display processing (S180), the cursor is displayed at the base position set in the base position calculation processing.

For example, in the sight cursor display processing (S180), the gaze position set at S130 can be employed as the position of the cursor on the display screen image, or the represent position preliminarily determined for the region including the gaze position can be employed as the position of the cursor on the display screen image.

In the former case where the gaze position is employed as the position of the cursor, the cursor can be displayed at an actual position instructed by the direction of the sight line of the user. In the latter case where the represent position is employed as the position of the cursor, the cursor can be displayed at the position slightly displaced from the sight position of the user. For example, when the user sees the content displayed on the display screen image, the cursor does not disturb the view of the user.

For example, in the sight cursor display processing (S180), the position of the selection object closest to the gaze position set at S130 can be employed as the position of the cursor on the display screen image, or the position in the unpatterned region close to the gaze position can be employed as the position of the cursor on the display screen image.

In the former case where the position of the selection object is employed as the position of the cursor, since the user can easily select the selection object on the display screen image, the user's convenience can be improved. In the latter case where the position in the unpatterned region is employed as the position of the cursor, since the cursor is not displayed over the content on the display screen image, a visibility of the user can be surely improved.

(Other Embodiments)

Although the embodiment of the present disclosure is described hereinabove, the present disclosure is not limited to the embodiment described above and may be implemented in various other ways without departing from the gist of the present disclosure.

For example, in the cursor display control processing of the above embodiment, when the sight detection unit 10 does not detect the direction of user's sight line with respect to the display screen image (S120; NO), the manual cursor display processing is suspended even when the manual operation detection unit 20 detects the manual operation of the operation device 2 (S150; YES). However, this processing may be executed not only in the case where the sight-input is set to be active, but also in the case where the sight-input is set to be off.

Although the sight detection unit 10 detects the direction of the sight line based on the user's image photographed by the camera 3 in the display control device 1 of the above embodiment, the present disclosure is not limited to the embodiment. For example, the direction of sight line may be detected based on a difference between values of potential of electrodes that are attached around eyes of the user. The direction of the sight line may be detected based on a position signal transmitted from a moving body fitted on the eyes such as contact lenses.

Although, in the display control device 1 of the above embodiments, the sight cursor display processing is executed in the case where the distance between the sight position, which is calculated in the sight position calculation processing (S110), and the present position on the display screen image, at which the cursor is presently displayed, exceeds the threshold distance (S160; YES), the present disclosure is not limited to the embodiment. For example, the sight cursor display processing may be executed in a case where the distance between the sight position calculated in the sight position calculation processing (S110) and a sight position previously stored in the RAM at previous S110 exceeds the threshold distance. Accordingly, when the user gradually moves the sight line to see the content displayed on the display screen image, the cursor is not moved to follow the direction of the sight line. Therefore, a visibility of sentences or the like is not decreased.

It is noted that a flowchart or the processing of the flowchart in the present disclosure includes sections (also referred to as steps or units), each of which is represented, for instance, as S100. Further, each section can be divided into several sub-sections, while several sections can be combined into a single section. Furthermore, each of thus configured sections can be also referred to as a circuit, device, module, or means.

Each of any sections or any combination of sections can be achieved as (i) a software section in combination with a hardware unit (for example, computer) or (ii) a hardware section (for example, integrated circuit, hard-wired logic circuit), including or not including a function of a related apparatus. Furthermore, the hardware section may be constructed inside of a microcomputer.

What is claimed is:

1. A display control device displaying a cursor and content on a display screen image, the display control device comprising:
 a sight detection unit detecting a direction of a sight line of a user with respect to the display screen image;
 a manual operation detection unit detecting a manual operation of the user; and
 a display control unit executing a cursor display control processing to display the cursor on the display screen image, the cursor display control processing including a sight cursor display processing to change a position of the cursor on the display screen image from a current position at which the cursor is currently displayed on the display screen image to a position determined based on a detection result of the sight detection unit, and a manual cursor display processing to change the position of the cursor on the display screen image from the current position to a position determined based on a detection result of the manual operation detection unit, wherein
 the display control unit includes a sight position calculation unit calculating a sight position on the display screen image corresponding to the direction of the sight line of the user,
 the display control unit includes a sight suspension unit determining whether the manual operation detection unit detects the manual operation of the user when the sight position calculated by the sight position calculation unit is different from the current position of the cursor, and
 the sight suspension unit suspends the sight cursor display processing by keeping the position of the cursor on the display screen image at the current position when the sight position is different from the current position of the cursor and the manual operation detection unit does not detect the manual operation of the user.

2. The display control device according to claim 1, wherein
 the display control unit further includes a manual operation suspension unit suspending the manual cursor display processing when the sight detection unit does not detect the direction of the sight line even when the manual operation detection unit detects the manual operation.

3. The display control device according to claim 1, wherein
 the display control unit includes a cursor movement distance calculation unit calculating a cursor movement distance when the sight position is different from the current position of the cursor and the manual operation detection unit detects the manual operation of the user,
 the cursor movement distance is defined as a distance between the sight position and the current position of the cursor,
 the display control unit executes the sight cursor display processing when the cursor movement distance is greater than a predetermined threshold distance, and
 the display control unit executes the manual cursor display processing when the cursor movement distance is equal to or smaller than the predetermined threshold distance.

4. The display control device according to claim 1, wherein
 in the sight cursor display processing, the position of the cursor is changed to the sight position calculated by the sight position calculation unit.

5. The display control device according to claim 1, wherein
 in the sight cursor display processing, the position of the cursor is changed to represent a position that is preliminarily determined within a region including the sight position calculated by the sight position calculation unit.

6. The display control device according to claim 1, wherein
 in the sight cursor display processing, the position of the cursor changed to a position of a selection object closest to the sight position calculated by the sight position calculation unit.

7. The display control device according to claim 1, wherein
 in the sight cursor display processing, the position of the cursor is changed to a position in an unpatterned region close to the sight position calculated by the sight position calculation unit.

8. A program allowing a computer to function as the sight detection unit, the manual operation detection unit and the display control unit according to claim 1.

9. A program product stored in a non-transitory tangible computer-readable medium, the program product comprising instructions allowing a computer to function as the sight detection unit, the manual operation detection unit and the display control unit according to claim 1.

10. The display control device according to claim 1, wherein the display screen image on which the content is displayed includes at least one of a webpage screen image, a desktop screen image, and an application screen image.

* * * * *